US012180908B2

(12) United States Patent
Cook et al.

(10) Patent No.: US 12,180,908 B2
(45) Date of Patent: Dec. 31, 2024

(54) THROTTLE BODY AND ADAPTER

(71) Applicant: Motion Raceworks, LLC, Dewitt, IA (US)

(72) Inventors: Doug Cook, Bradenton, FL (US); Andy Cook, Long Grove, IA (US); Brian Jack, Davenport, IA (US); Tyler Sandau, Moline, IA (US)

(73) Assignee: Motion Raceworks, LLC, Dewitt, IA (US)

( * ) Notice: Subject to any disclaimer, the term of this patent is extended or adjusted under 35 U.S.C. 154(b) by 0 days.

(21) Appl. No.: 18/469,325

(22) Filed: Sep. 18, 2023

(65) Prior Publication Data

US 2024/0003304 A1 Jan. 4, 2024

Related U.S. Application Data

(63) Continuation of application No. PCT/US2022/030547, filed on May 23, 2022.

(Continued)

(51) Int. Cl.

| | |
|---|---|
| ***F02D 9/10*** | (2006.01) |
| ***F02D 9/02*** | (2006.01) |
| ***F02M 35/10*** | (2006.01) |

(52) U.S. Cl.

CPC ............ *F02D 9/1035* (2013.01); *F02D 9/02* (2013.01); *F02D 9/107* (2013.01); *F02M 35/10144* (2013.01); *F02M 35/10354* (2013.01)

(58) Field of Classification Search

CPC .......... F02D 9/1035; F02D 9/02; F02D 9/107; F02D 9/08; F02M 35/10144;

(Continued)

(56) References Cited

U.S. PATENT DOCUMENTS 5,341,773 A * 8/1994 Schulte ............ F02M 35/10321 285/305
5,967,116 A 10/1999 Kawashima et al.

(Continued)

FOREIGN PATENT DOCUMENTS

| | | |
|---|---|---|
| JP | 2004060629 A | 2/2004 |
| WO | 2006044893 A2 | 4/2006 |
| WO | 2022246321 A1 | 11/2022 |

OTHER PUBLICATIONS

PCT/US2022/030547 , "International Application Serial No. PCT/US2022/030547, International Search Report and Written Opinion mailed Sep. 1, 2022", Motion Raceworks, LLC, 13 pages.

(Continued)

*Primary Examiner* — Syed O Hasan

(74) *Attorney, Agent, or Firm* — GTC Law Group PC & Affiliates

(57) ABSTRACT

Systems, methods, techniques and apparatuses of throttle bodies are disclosed. One exemplary embodiment is an intake system comprising a throttle body device including a first interface structured to be coupled to an intake manifold, and a second interface including a receiving bore; and an intake adapter including a third interface including a radial groove structured to house a seal device, and a fourth interface structured to be coupled to an intake conduit, wherein the third interface of the intake of the intake adapter is structured to be inserted into the receiving bore of the second interface of the throttle body device.

22 Claims, 10 Drawing Sheets

Related U.S. Application Data

(60) Provisional application No. 63/191,657, filed on May 21, 2021.

(58) Field of Classification Search
CPC ....... F02M 35/10354; F02M 35/10262; F02M 29/06; F02M 7/245; F02M 35/104
See application file for complete search history.

(56) References Cited

U.S. PATENT DOCUMENTS

| | | | | |
|---|---|---|---|---|
| 7,472,681 | B2 | 1/2009 | Tanimura et al. | |
| 7,481,198 | B2 | 1/2009 | Tweet | |
| 2002/0185106 | A1 * | 12/2002 | Storz | F02M 35/116<br>123/184.21 |
| 2010/0065028 | A1 * | 3/2010 | Styles | F02M 26/19<br>123/306 |

OTHER PUBLICATIONS

PCT/US2022/030547 , "International Application Serial No. PCT/US2022/030547, International Preliminary Report on Patentability mailed Nov. 21, 2023", Motion Raceworks, LLC, 8 pages.

* cited by examiner

THROTTLE BODY AND ADAPTER

CROSS-REFERENCE TO RELATED APPLICATION

This application is a continuation of International Application Serial Number PCT/US2022/030547, filed 23 May 2022, published as 2022/246321.

International Application Serial Number claims priority to U.S. Provisional Patent Application 63/191,657, filed on 21 May 2021, entitled "THROTTLE BODY".

Each of the foregoing patent applications is incorporated herein by reference in their entirety for all purposes.

BACKGROUND

The present disclosure relates generally to a throttle body for an internal combustion engine. An intake system of an internal combustion engine, which includes a throttle body, is structured to control and provide air to the intake manifold of the internal combustion engine. As components are added to an engine compartment and overall engine compartment sizes continue to decrease, the design and installation of the intake system becomes more size conscious. Existing throttle bodies suffer from a number of shortcomings and disadvantages. There remain unmet needs including reducing intake system size and reducing design time requirements. For instance, in order for other systems in an engine compartment to increase, the size of the intake system must decrease while still performing the same function. Additionally or alternatively, installing a throttle body at a later time after initial manufacture, including for example to support larger or modified intake, creates challenges to meet the same footprint of the original throttle body, and/or to create a throttle body that is able to be utilized on a number of different installations having variability in the available space.

SUMMARY

Example embodiments of the disclosure include systems, methods, techniques and apparatuses for intake in an internal combustion engine. Further embodiments, forms, objects, features, advantages, aspects, and benefits of the disclosure shall become apparent from the following description and drawings.

An example intake system includes a throttle body device and an intake adapter. The example throttle body device includes a first interface structured to be coupled to an intake manifold, and a second interface including a receiving bore. The example intake adapter includes a third interface including a radial groove to house a seal device, and a fourth interface structured to be coupled to an intake conduit. The third interface is structured to be inserted into the receiving bore of the throttle body device, thereby forming a sealed coupling.

Certain further aspects of the example system are described following, any one or more of which may be present in certain embodiments. An example seal device includes an O-ring, a gasket, or a square seal. An example intake adapter is mounted to the throttle body device using a number of fasteners, for example with four screws. An example throttle body device includes a number of bores, each bore structured to receive one of the number of fasteners.

An example kit includes a throttle body having a first interface structured to couple to an intake manifold, and a second interface including a receiving bore. The example kit includes an intake adapter having a third interface including a radial grove, and a sealing device sized to seat in the radial groove. The third interface is sized to be received in the receiving bore, thereby forming a sealed coupling.

Certain further aspects of the example kit are described following, any one or more of which may be present in certain embodiments. An example kit includes the sealing device as an O-ring, a gasket, or a square seal. An example intake adapter includes an elbow adapter. An example intake adapter includes a twin intake adapter. An example kit includes an elbow adapter and a twin intake adapter. An example kit includes the intake adapter structured to be mounted to the throttle body device using number of fasteners, and the example kit optionally includes the number of fasteners.

An example procedure includes an operation to couple a first interface of a throttle body to an intake manifold, an operation to sealingly couple a third interface of an intake adapter to a second interface of the throttle body, and an operation to couple an intake conduit to a fourth interface of the intake adapter.

Certain further aspects of the example procedure are described following, any one or more of which may be present in certain embodiments. An example operation to sealing couple the adapter to the interface includes an operation to seat a sealing device in a radial groove of the third interface. An example procedure includes the intake adapter being a twin intake adapter, and the operation to couple the intake conduit including connecting two intake conduits, each to one side of the twin intake adapter. An example procedure includes removing a second throttle body from an internal combustion engine before the coupling the first interface of the throttle body to the intake manifold, where the intake manifold is an intake manifold of the internal combustion engine.

DETAILED DESCRIPTION OF ILLUSTRATIVE EMBODIMENTS

For the purposes of clearly and concisely describing non-limiting example embodiments of the disclosure, the manner and process of making and using the same, and to enable the practice, making, and use of the same, reference will now be made to certain example embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art with the benefit of the present disclosure.

Figure 1:
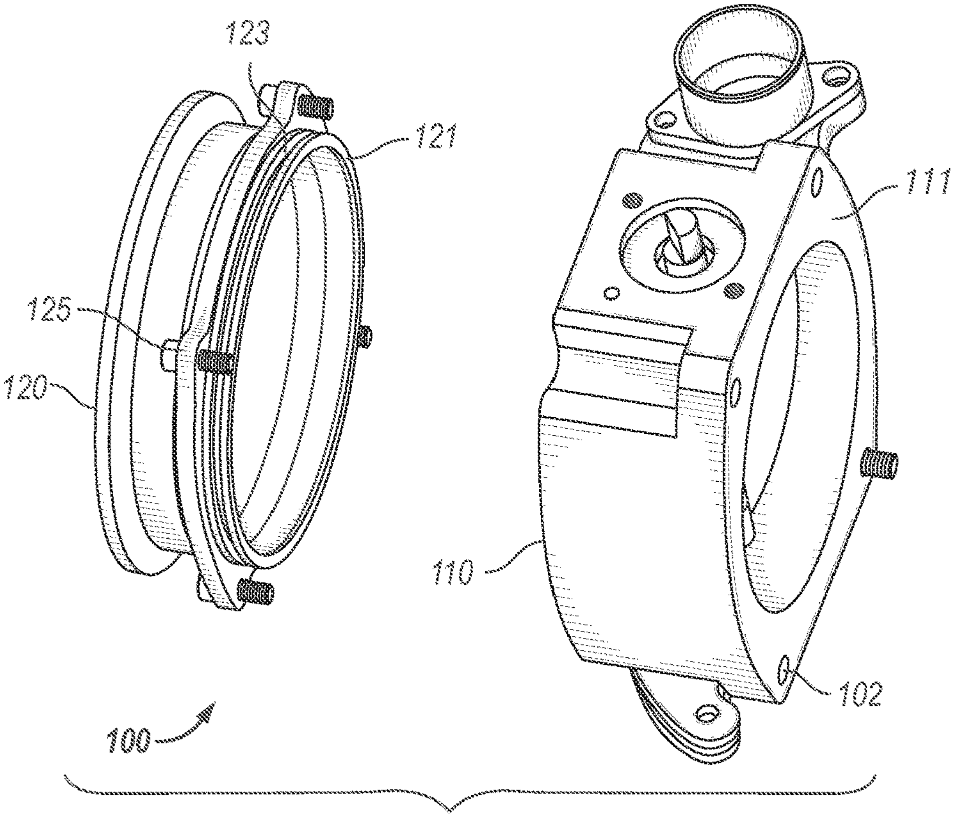
FIG. 1 is a perspective view of an example throttle body system.
Figure 2:
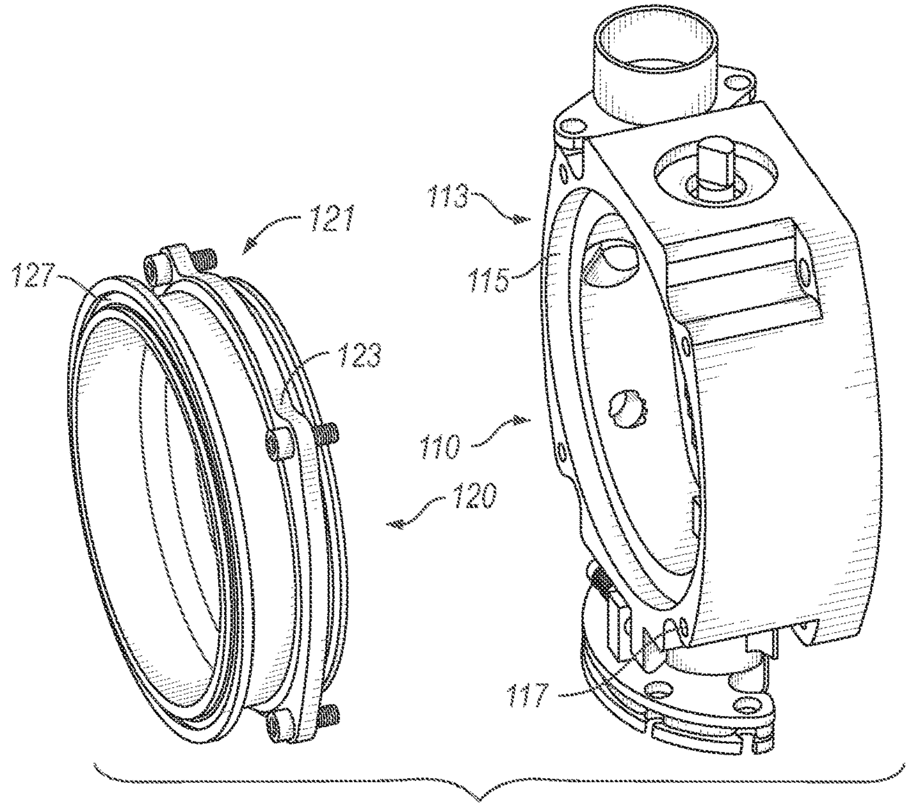
FIG. 2 is another perspective view of the example throttle body system.

With reference to FIGS. 1 and 2, there is illustrated an example throttle body system 100 including an example throttle body device 110 and an example intake adapter 120. The example intake adapter 120 is a straight adapter, but may include a shaped portion, such as an elbow portion or a forked portion, depending upon the configuration of the intake conduit (e.g., from the air filter) for the particular internal combustion engine upon which the throttle body system 100 is being installed. It shall be appreciated that throttle body system 100 may be implemented in a variety of applications, including vehicular internal combustion engines, or other systems with an air conduit having a throttle positioned to control the air flow.

The example throttle body device 110 is structured to be coupled between adapter 120 and an engine intake manifold. Device 110 is also structured to selectively allow air to flow from the air intake system to the internal combustion engine. Device 110 includes an interface 111 structured to be coupled to the intake manifold, for example having selected bolt holes 102 on the first interface 111 configured to mount to an intake manifold. In the illustrated embodiment, interface 111 includes four holes through which fasteners are passed in order to couple device 110 to the intake manifold. In other embodiments, throttle body device 110 includes another arrangement structured to attach throttle body device 110 to the engine intake manifold.

Throttle body device 110 also includes an interface 113 structured to couple device 110 to adapter 120. Interface 113 includes a plurality of bores 117 structured to receive fasteners which are passed through adapter 120 to couple device 110 and adapter 120. In certain embodiments, the fasteners may be screws or bolts. Interface 113 also includes a receiving bore 115 structured to receive a seal device of adapter 120. A depth of the receiving bore is structured such that the seal device may be inserted into receiving bore 115 when adapter 120 is coupled to device 110.

Figure 9:
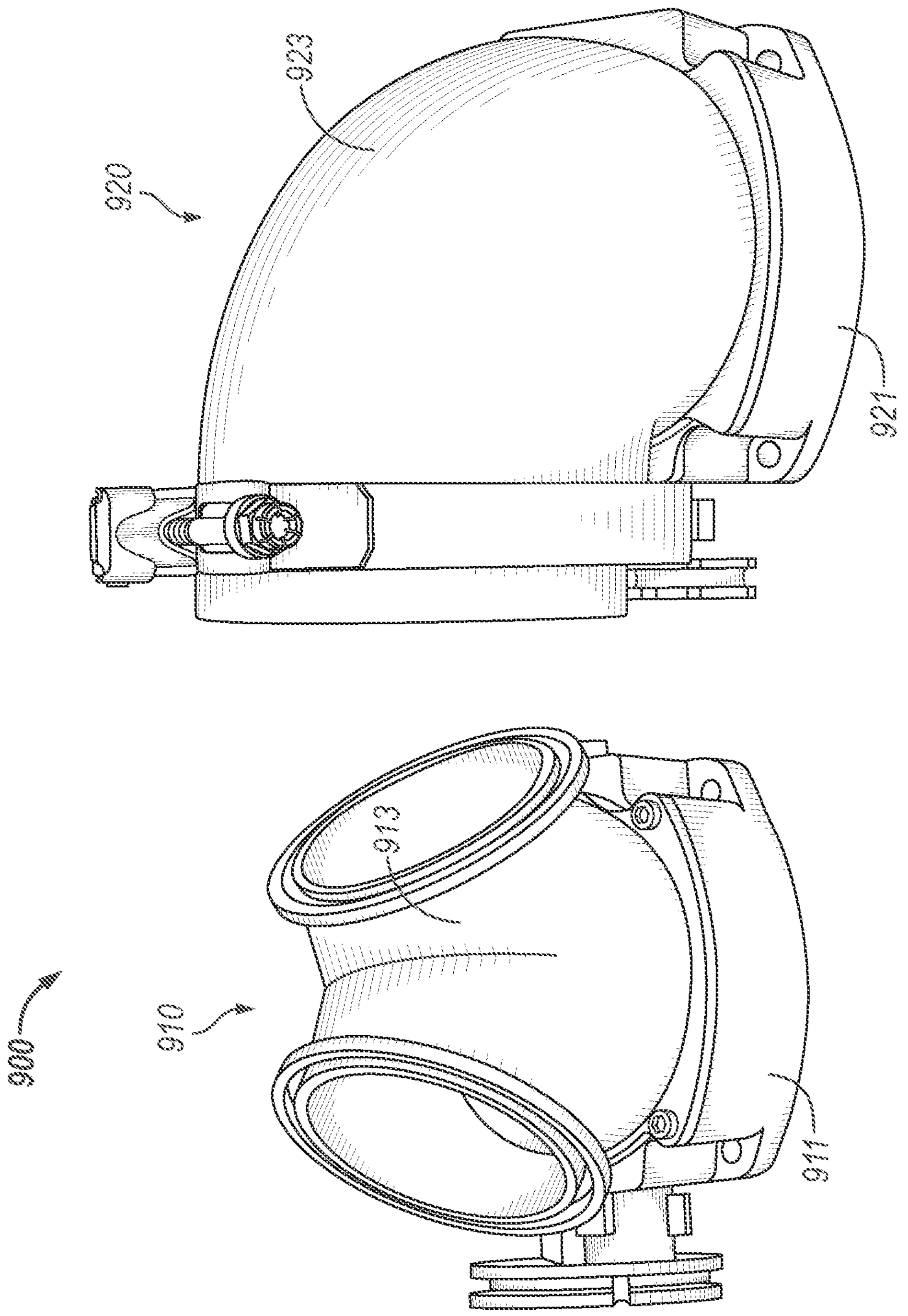
FIG. 9 is a schematic illustration depicting another example throttle body system configured for an elbow intake, and configured for a twin intake.

Adapter 120 includes an interface 127 structured to be coupled to an intake conduit, such as a pipe or a hose. In certain embodiments, the interface for the adapter 120 may be at interface 127 to couple to the intake conduit, or the interface for the adapter 120 may be at the end of an extension portion of the adapter 120, for example an elbow extension or a Y-shaped (forked, or twin) extension, for example as depicted in FIG. 9. Where an extension is utilized, the adapter portion 120 may be coupled to the extension portion 910, 920, the interface on the other side of the extension portion couples the adapter to the air intake conduit, and/or the adapter portion 120 may be integrally formed with the extension portion 910, 920. The optional utilization of extension portions 910, 920 allow the throttle body system 100 to be utilized in a variety of applications with minimal differences in the overall footprint of the air intake system relative to a previously configured system before the throttle body system 100 is installed.

Adapter 120 also includes an interface 121 structured to be at least partially inserted into receiving bore 115 of throttle body device 110. Interface 121 includes a groove 123 structured to house a seal device. In certain embodiments, the seal device is an O-ring, or another type of radial seal. In certain embodiments, the seal device may be a gasket or a square seal, although any type of sealing assembly is contemplated herein. When adapter 120 and device 110 are fully coupled, the seal device is located within receiving bore 115, and forms a seal for the air flow between the adapter 120 and the throttle body device 110. Adapter 120 also includes a plurality of holes 125 structured to receive fasteners passing through the plurality of holes 125 and entering the plurality of bores 117 to couple adapter 120 to throttle body device. In the illustrated embodiments, adapter 120 includes four holes, but adapter 120 may include another number of holes in other embodiments.

It shall be appreciated that throttle body device 110 may be coupled to a plurality of different adapters having a variety of shapes and configurations. In this way, exemplary throttle body device 110 may be used in many different applications even though a required shape or orientation of the intake conduit changes. Furthermore, by using the exemplary radial seal and fastener arrangement of the adapter, throttle body system 100 eliminates the need for an elongated section necessary for using a clamp or other device to attach an intake conduit to throttle body device 110, thereby reducing the size throttle body system 100 compared to conventional throttle bodies. The exemplary throttle body system also eliminates the need to weld an intake system to the throttle body device. It shall be appreciated that any or all of the illustrated or described features of throttle body system 100 may also be present in the other throttle body systems disclosed herein.

Figure 3:
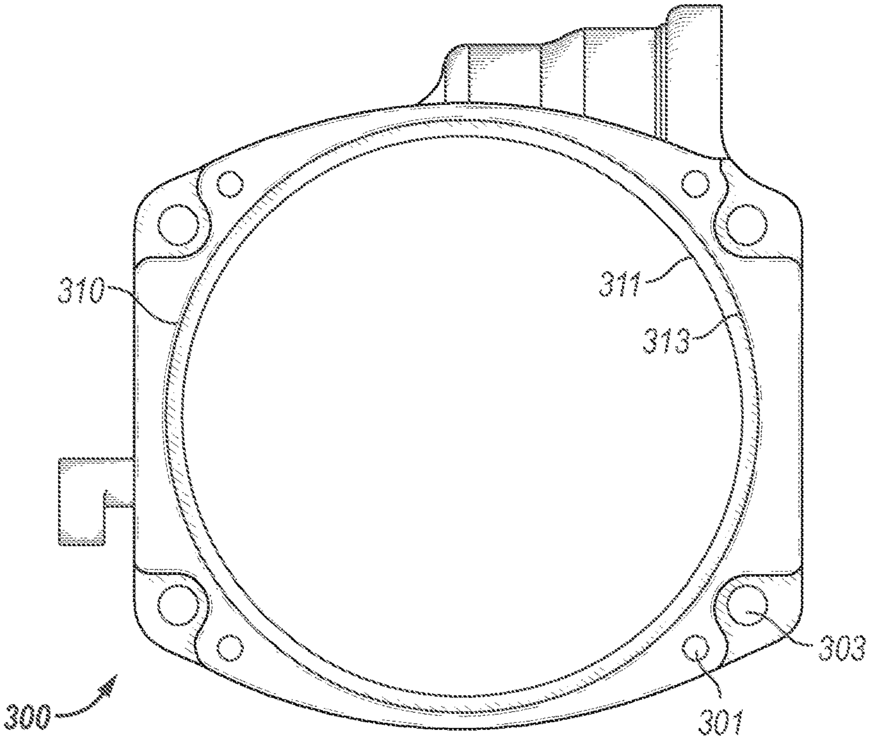
FIG. 3 is a schematic illustration of an example throttle body.
Figure 4:
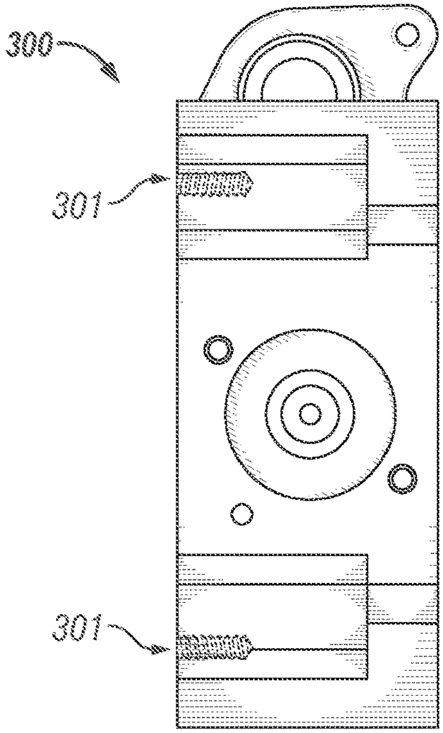
FIG. 4 is an example partially transparent schematic illustration of an example throttle body.

With reference to FIGS. 3 and 4, there are a section view and a side view of a schematic diagram illustrating an example throttle body device 300. Device 300 includes a receiving bore 310 having an inner diameter 311 and an outer diameter 313, receiving bore 310 being structured such that the interface of an exemplary adapter includes an outer diameter less than outer diameter 313 and greater than inner diameter 311. Throttle body device 300 also includes a plurality of holes 303 structured to receive fasteners effective to mount throttle body device 300 to an intake manifold of an internal combustion engine. Throttle body device 300 also includes a plurality of bores 301 structured to receive fasteners having passed through holes in an example adapter to mount the adapter to device 300. It shall be appreciated that any or all of the illustrated or described features of throttle body device 300 may also be present in the other throttle bodies disclosed herein.

Figure 5:
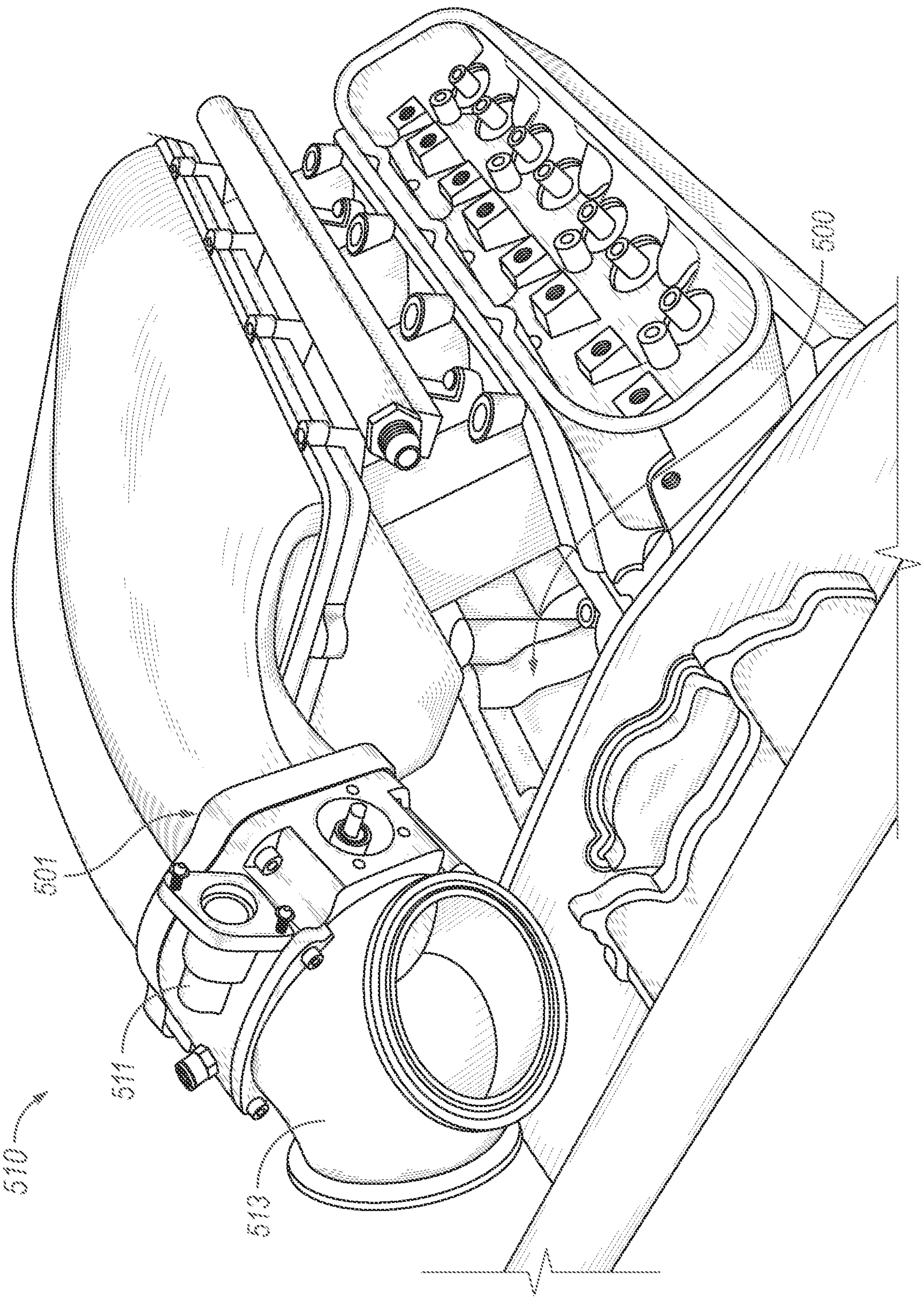
FIG. 5 is a schematic illustration of an example throttle body system installed on an internal combustion engine.

With reference to FIG. 5, there is illustrated an example internal combustion engine 500 including an example throttle body system 510 coupled to an intake manifold 501. Throttle body system 510 includes throttle body device 511 coupled to intake manifold 501. Throttle body system 510 also includes forked adapter 513 coupled to throttle body device 511 via an adapter portion (not labeled, e.g. as depicted in FIGS. 1-4). It shall be appreciated that any or all of the illustrated or described features of internal combustion engine 500 may also be present in the other engines disclosed herein.

Figure 6:
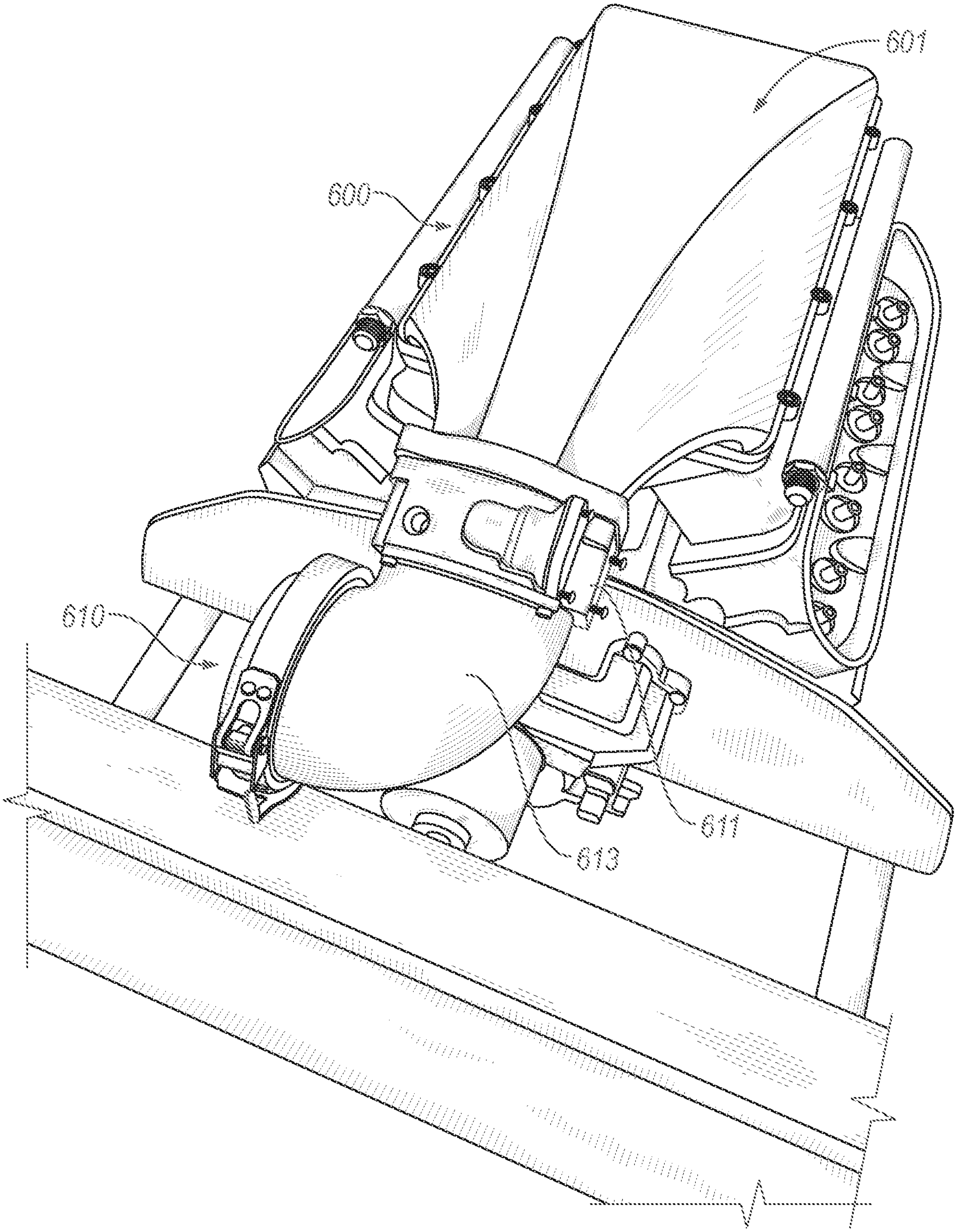
FIG. 6 is a schematic illustration of another example throttle body system installed on an internal combustion engine.

With reference to FIG. 6, there is illustrated an example internal combustion engine 600 including an example throttle body system 610 coupled to an intake manifold 601. Throttle body system 610 includes throttle body device 611 coupled to intake manifold 601. Throttle body system 610 also includes 90 degree adapter 613 coupled to throttle body device 611, for example via an adapter portion (not labeled, e.g. as depicted in FIGS. 1-4). It shall be appreciated that any or all of the illustrated or described features of internal combustion engine 600 may also be present in the other engines disclosed herein.

Figure 7:
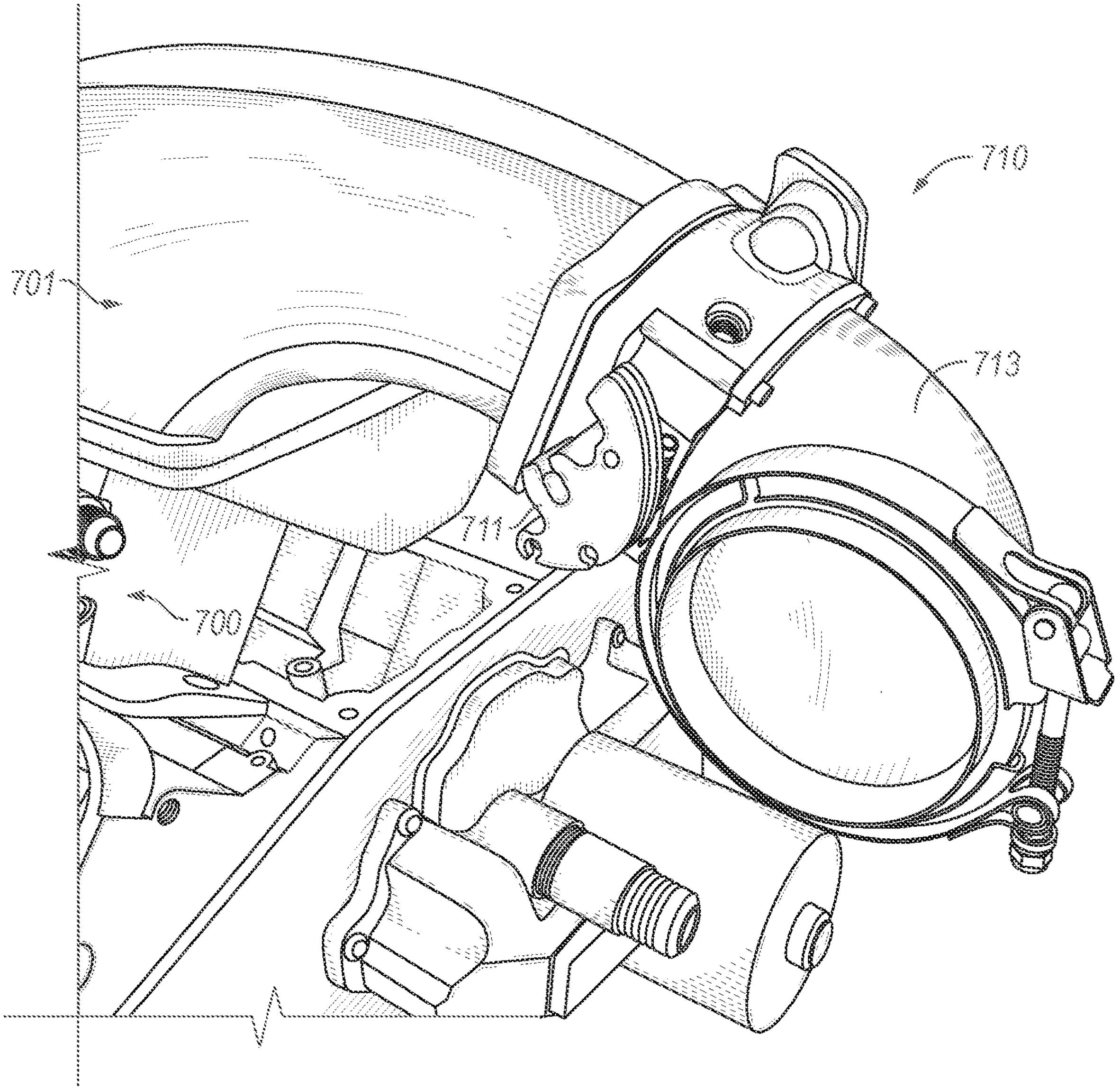
FIG. 7 is a schematic illustration of another example throttle body system installed on an internal combustion engine.

With reference to FIG. 7, there is illustrated an example internal combustion engine 700 including an example throttle body system 710 coupled to an intake manifold 701. Throttle body system 710 includes throttle body device 711 coupled to intake manifold 701. Throttle body system 710 also includes 90 degree adapter 713 coupled to throttle body device 711. It shall be appreciated that any or all of the illustrated or described features of internal combustion engine 700 may also be present in the other engines disclosed herein.

Figure 8:
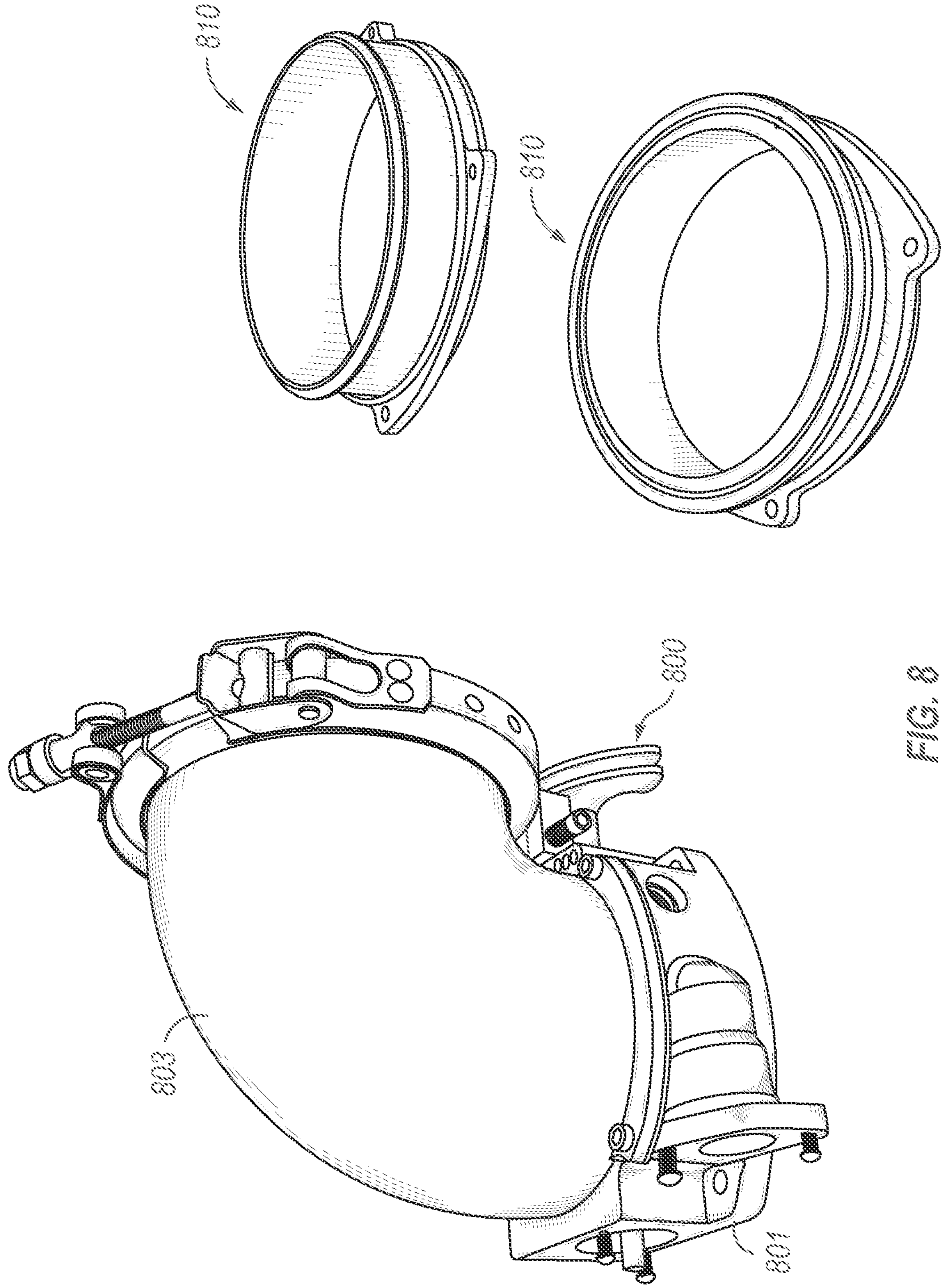
FIG. 8 is a schematic illustration depicting an example throttle body system coupled to an air intake, and detail view of an intake adapter for the throttle body system.

With reference to FIG. 8, there is illustrated a throttle body system 800 and components 810 thereof. Throttle body system 800 includes throttle body device 801 and 90 degree adapter 803. FIG. 8 also illustrates a plurality of straight adapters 810. It shall be appreciated that any or all of the illustrated or described features of system 800 and components 810 may also be present in the other throttle body systems disclosed herein. In certain embodiments, a straight adapter portion 810 may be present, for example to couple to an air intake provided in a straight engagement with the throttle body device 801), and/or to couple to an extension portion 803. In certain embodiments, the adapter is formed integrally with the extension portion 803. In certain embodiments, a throttle body system kit is provided having a selected adapter, and/or having a number of adapters (e.g., straight, elbow, and/or forked), allowing flexibility to install the throttle body system kit on a variety of engines.

With reference to FIG. 9, there is illustrated a plurality of throttle body systems 900 including throttle body system 910 and throttle body system 920. Throttle body system 910 includes throttle body device 911 and forked adapter 913. Throttle body system 920 includes throttle body device 911 and 90 degree adapter 913.

Figure 10:
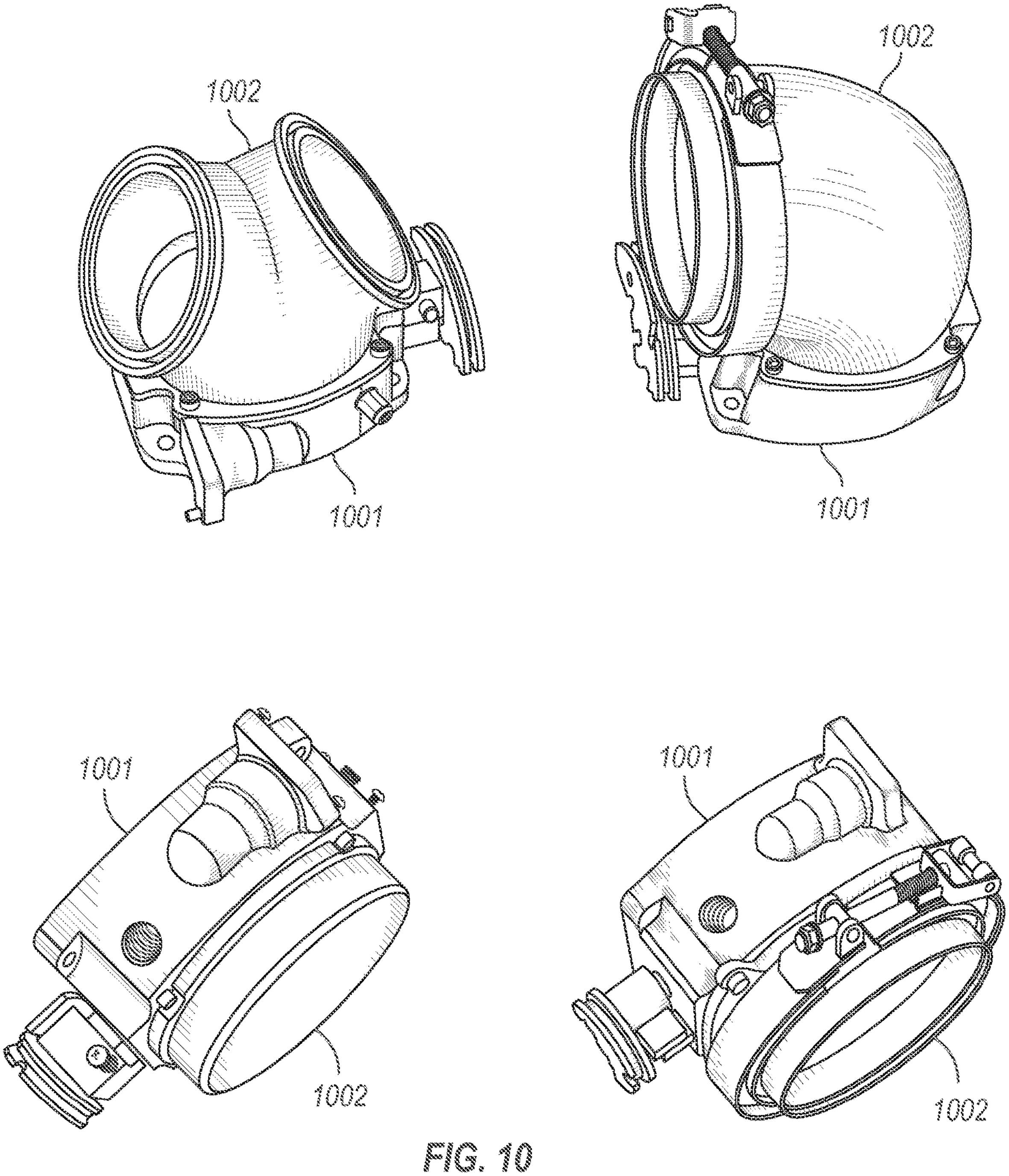
FIG. 10 is a schematic illustration of views of a throttle body system.
Figure 11:
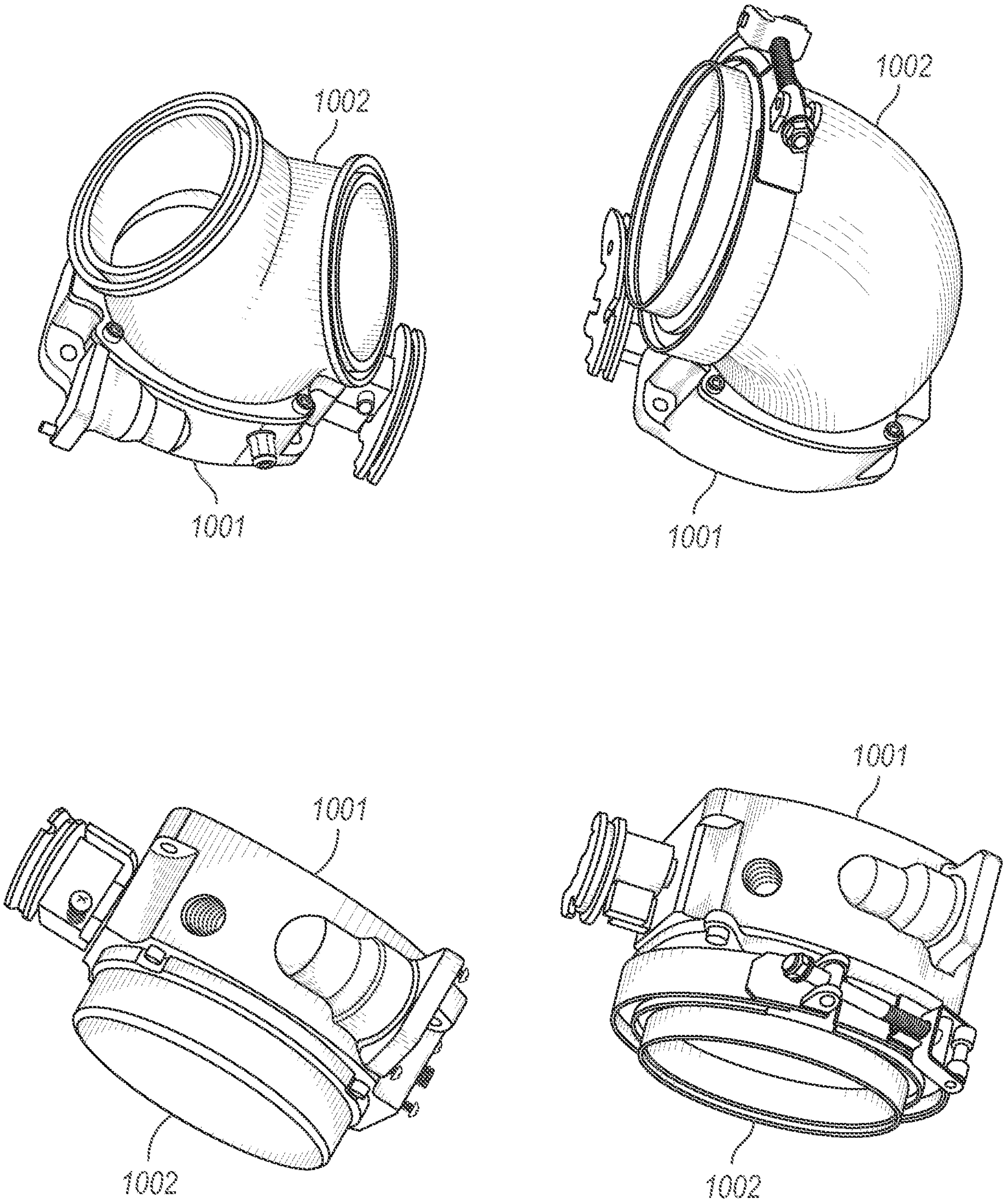
FIG. 11 is a schematic illustration of views of a throttle body system.

With reference to FIG. 10, a number of example throttle body devices 1001 coupled to a variety of adapters 1001 are depicted, including multiple adapter arrangements configured to couple with a variety of air intake conduits. Referencing FIG. 11, the example throttle body devices 1001 coupled to a variety of adapters 1001 are depicted, consistent with the example of FIG. 10, with an adjusted perspective to illustrate aspects of the example throttle body systems.

Figure 12:
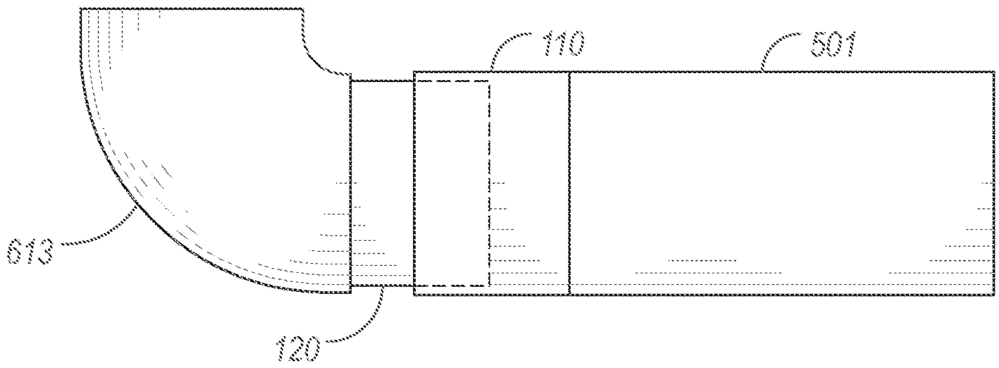
FIG. 12 is a schematic block diagram of a throttle body system.

Referencing FIG. 12, an example throttle body system includes a throttle body 110 having a first interface to couple to a intake manifold 501, and a second interface that receives a seal portion of an adapter 120 and couples the throttle body 110 to the adapter 120. The example adapter 120 includes an elbow extension 613, which may be coupled to the adapter 120 and/or which may be formed integrally with the adapter 120. The example of FIG. 12 is a schematic depiction consistent with certain embodiments set forth herein.

Figure 13:
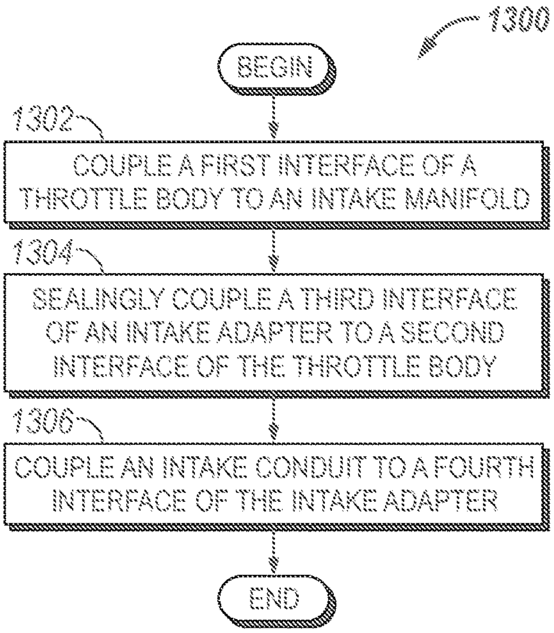
FIG. 13 is a schematic flow diagram of a procedure for installing a throttle body system.
Figure 14:
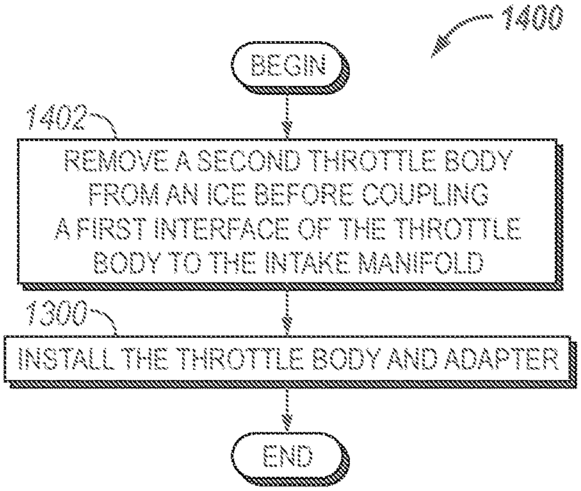
FIG. 14 is a schematic flow diagram of a procedure for replacing a throttle body.

Referencing FIG. 13, an example procedure 1300 for installing a throttle body system is schematically depicted. The example procedure 1300 includes an operation 1302 to couple a first interface of a throttle body device to an intake manifold, and an operation 1304 to sealingly couple a third interface of an intake adapter to a second interface of the throttle body device. The example procedure 1300 further includes an operation 1306 to couple an air intake conduit to a fourth interface of the adapter, where the fourth interface of the adapter may be on a straight line portion of the adapter, an elbow portion of the adapter, or a forked portion of the adapter.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. Accordingly, in certain embodiments an order of operations and grouping of operations as described is explicitly contemplated herein, and in certain embodiments re-ordering, subdivision, and/or different grouping of operations is explicitly contemplated herein.

While the present disclosure has been illustrated and described in detail in the drawings and foregoing description, the same is to be considered as illustrative and not restrictive in character, it being understood that only certain example embodiments have been shown and described, and that all changes and modifications that come within the spirit of the present disclosure are desired to be protected. It should be understood that while the use of words such as "preferable," "preferably," "preferred" or "more preferred" utilized in the description above indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. An intake system comprising:

a throttle body including:

a first interface structured to be coupled to an intake manifold, a second interface including a receiving bore, and a valve disposed between the first interface and the second interface and structured to vary an intake of air from an intake conduit; and an intake adapter structured to be disposed between the throttle body and the intake conduit, the intake adapter including:

a third interface, at a first opening of the intake adapter, including a radial groove structured to house a seal device, and a fourth interface, at a second opening of the intake adapter fluidly opposite the first opening, structured to be coupled to the intake conduit, wherein: the third interface of the intake adapter is structured to be inserted into the receiving bore of the second interface of the throttle body.

2. The intake system of claim 1, wherein the seal device is an O-ring.

3. The intake system of claim 1, wherein the seal device is a gasket.

4. The intake system of claim 1, wherein the seal device is a square seal.

5. The intake system of claim 1, wherein the intake adapter is structured to be mounted to the throttle body using a plurality of fasteners.

6. The intake system of claim 5, wherein the intake adapter is structured to be mounted to the throttle body using four screws.

7. The intake system of claim 6, wherein the throttle body includes four bores, each bore structured to receive one of the four screws effective to couple the intake adapter to the throttle body.

8. A kit, comprising:

a throttle body having a first interface structured to be coupled to an intake manifold, a second interface including a receiving bore, and a valve disposed between the first interface and the second interface and structured to vary an intake of air from an intake conduit;

an intake adapter structured to be disposed between the throttle body and the intake conduit, the intake adapter having:

a third interface, at a first opening of the intake adapter, including a radial groove; and a fourth interface, at a second opening of the intake adapter fluidly opposite the first opening, structured to be coupled to the intake conduit; and a sealing device sized to seat in the radial groove.

9. The kit of claim 8, wherein the sealing device is an O-ring.

10. The kit of claim 8, wherein the sealing device is a gasket.

11. The kit of claim 8, wherein the sealing device is a square seal.

12. The kit of claim 8, wherein the intake adapter comprises an elbow adapter.

13. The kit of claim 8, wherein the intake adapter comprises a twin intake adapter.

14. The kit of claim 8, further comprising a second intake adapter, wherein the intake adapter comprises an elbow adapter, and wherein the second intake adapter comprises a twin intake adapter.

15. The kit of claim 8, wherein the intake adapter is structured to be mounted to the throttle body using a plurality of fasteners.

16. The kit of claim 15, wherein the intake adapter is structured to be mounted to the throttle body using four screws.

17. The kit of claim 16, wherein the throttle body includes four bores, each bore structured to receive one of the four screws effective to couple the intake adapter to the throttle body.

18. A method, comprising:

coupling a first interface of a throttle body to an intake manifold, wherein the throttle body has a valve disposed between the first interface and a second interface of the throttle body and is structured to vary an intake of air from an intake conduit;

sealingly coupling a third interface of an intake adapter to the second interface of the throttle body, wherein the third interface is at a first opening of the intake adapter; and coupling the intake conduit to a fourth interface of the intake adapter, wherein: the fourth interface is at a second opening fluidly opposite the first opening, and the intake adapter is disposed between the throttle body and the intake conduit.

19. The method of claim 18, wherein the sealingly coupling comprises seating a sealing device in a radial groove of the third interface.

20. The method of claim 18, wherein the intake adapter comprises a twin intake adapter, and wherein the coupling the intake conduit comprises connecting two intake conduits, each to one side of the twin intake adapter.

21. The method of claim 18, wherein the intake adapter comprises an elbow adapter.

22. The method of claim 18, further comprising removing a second throttle body from an internal combustion engine before the coupling the first interface of the throttle body to the intake manifold, wherein the intake manifold comprises an intake manifold of the internal combustion engine.

* * * * *